(12) United States Patent
Hara

(10) Patent No.: US 11,005,130 B2
(45) Date of Patent: May 11, 2021

(54) ONBOARD BATTERY FOR VEHICLE

(71) Applicant: FUJI JUKOGYO KABUSHIKI KAISHA, Tokyo (JP)

(72) Inventor: Toshiyuki Hara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 97 days.

(21) Appl. No.: 14/991,994

(22) Filed: Jan. 10, 2016

(65) Prior Publication Data

US 2016/0211560 A1    Jul. 21, 2016

(30) Foreign Application Priority Data

Jan. 16, 2015   (JP) .............................. JP2015-006906

(51) Int. Cl.
| | |
|---|---|
| *H01M 10/6556* | (2014.01) |
| *H01M 10/6563* | (2014.01) |
| *H01M 10/625* | (2014.01) |
| *H01M 2/10* | (2006.01) |
| *H01M 10/613* | (2014.01) |
| *H01M 10/6566* | (2014.01) |

(Continued)

(52) U.S. Cl.
CPC ....... *H01M 10/6563* (2015.04); *H01M 10/46* (2013.01); *H01M 10/613* (2015.04); *H01M 10/625* (2015.04); *H01M 10/6557* (2015.04); *H01M 10/6566* (2015.04); *H01M 50/20* (2021.01); *H01M 10/647* (2015.04); *H01M 2220/20* (2013.01)

(58) Field of Classification Search
CPC combination set(s) only.
See application file for complete search history.

(56) References Cited

U.S. PATENT DOCUMENTS

| | | | |
|---|---|---|---|
| 2004/0107718 A1* | 6/2004 | Bowman | ................. F04D 25/06 62/259.2 |
| 2007/0072061 A1* | 3/2007 | Shimizu | .............. H01M 2/1077 429/62 |

(Continued)

FOREIGN PATENT DOCUMENTS

| | | | |
|---|---|---|---|
| CN | 103917390 A | 7/2014 | |
| JP | 07-15160 U | * 3/1995 | ............... B23K 9/10 |

(Continued)

OTHER PUBLICATIONS

Office Action received for Japanese Patent application No. 2015-006906, dated Aug. 30, 2016, 5 pages of office action including 3 pages of English translation.

(Continued)

*Primary Examiner* — Amanda J Barrow
(74) *Attorney, Agent, or Firm* — Chip Law Group

(57) ABSTRACT

An onboard battery for a vehicle includes battery modules each including battery cells disposed therein, a housing case that houses the battery modules, and intake ducts that introduce cooling air into the battery modules. The cooling air is taken from rearward into the battery modules via the intake ducts. The battery modules include at least three battery modules, at least two of the battery modules being disposed in upper and lower stages. At least two of the battery modules are arranged along a longitudinal direction. One of the battery modules is disposed at the forefront.

10 Claims, 11 Drawing Sheets

(51) Int. Cl.
*H01M 10/6557* (2014.01)
*H01M 10/46* (2006.01)
*H01M 50/20* (2021.01)
*H01M 10/647* (2014.01)

(56) References Cited

U.S. PATENT DOCUMENTS

| | | | | |
|---|---|---|---|---|
| 2007/0144804 A1* | 6/2007 | Pike | ............ | B60L 11/1874 |
| | | | | 180/170 |
| 2010/0316895 A1* | 12/2010 | Hedrich | ............ | H01M 2/1077 |
| | | | | 429/83 |
| 2013/0202936 A1 | 8/2013 | Kosaki et al. | | |
| 2014/0262573 A1* | 9/2014 | Ito | ............ | B60K 1/04 |
| | | | | 180/68.5 |

FOREIGN PATENT DOCUMENTS

| | | | | |
|---|---|---|---|---|
| JP | 07-015160 U | 3/1995 | | |
| JP | 2012-054054 A | 3/2012 | | |
| JP | 5206110 B | 6/2013 | | |
| JP | 2014-035969 A | 2/2014 | | |
| JP | 2014-093207 | * 5/2014 | ............ | H01M 10/60 |
| JP | 2014093207 A | 5/2014 | | |

OTHER PUBLICATIONS

Office Action Received for Chinese Patent Application No. 201610014041.5, dated Sep. 5, 2017, 06 pages of Office Action Including 06 pages of English Translation.

* cited by examiner

ONBOARD BATTERY FOR VEHICLE

CROSS-REFERENCE TO RELATED APPLICATIONS

The present application claims priority from Japanese Patent Application No. 2015-006906 filed on Jan. 16, 2015, the entire contents of which are hereby incorporated by reference.

BACKGROUND

1. Technical Field

The present disclosure relates to the technical field of onboard batteries that are installed in vehicles, such as automobiles, and can be used even in cold areas.

2. Related Art

Onboard batteries are installed in various vehicles, such as automobiles, in order to supply electric power to motors and other various electrical components.

In recent years, in particular, vehicles such as electric vehicles (EV), hybrid electric vehicles (HEV), and plug-in hybrid electric vehicles (PHEV) have gained widespread use. In these electricity-driven vehicles, onboard batteries having a high electricity-storage function are installed.

An onboard battery includes a housing case and a battery module housed in the housing case. The battery module is configured by, for example, arranging a plurality of battery cells (secondary batteries), such as nickel hydrogen batteries or lithium ion batteries. In an onboard battery to be installed in an electric vehicle or the like, in order to retain a high electricity-storage function, a plurality of battery modules are disposed in the housing case and battery cells in each of the battery modules are connected in series or in parallel.

An example of an onboard battery is a type in which the battery modules are disposed in two stages of upper and lower stages in the housing case as a structure for retaining a high electricity-storage function (see Japanese Patent No. 5206110).

The onboard battery disclosed in Japanese Patent No. 5206110 is disposed in a rear trunk, and the lower-stage battery module is inserted into a depressed part having an upward opening in a floor panel, thereby securing a large space of the trunk.

Note that a battery cell generates heat during driving, and thus, an onboard battery needs to suppress an increase in temperature due to the heat by cooling the battery cell so as to secure favorable performance of the battery cell and other various control devices disposed inside the housing case. The above-described onboard battery, in which the plurality of battery modules are disposed, generates an especially large amount of heat. Therefore, it is desirable to increase the cooling efficiency of the plurality of battery modules.

SUMMARY OF THE INVENTION

Therefore, an object of the present disclosure is to increase the cooling efficiency of the battery cells to suppress an increase in temperature due to the heat generated by the battery cells.

An onboard battery for a vehicle according to an aspect of the present disclosure is an onboard battery including: battery modules each including battery cells disposed therein; a housing case that houses the battery modules; and at least one intake duct that introduces cooling air into the battery modules. The cooling air is taken from rearward into the battery modules via the intake duct. The battery modules include at least three battery modules, at least two of the battery modules being disposed in upper and lower stages. At least two of the battery modules are arranged along a longitudinal direction. One of the battery modules is disposed at a forefront.

The one of the battery modules being disposed at the forefront may disposed in a middle stage with respect to the two of the battery modules being disposed in the upper and lower stages.

The onboard battery may include a fan that is linked to the at least one intake duct. The fan may be disposed on at least one of left and right in a rear end part of the housing case.

The at least one intake duct may include a first intake duct and a second intake duct. The first intake duct may cause the cooling air to be introduced into at least one of the battery modules, and the second intake duct may cause the cooling air to be introduced into at least another one of the battery modules.

The cooling air that has been taken in from the first intake duct and cooled the at least one of the battery modules may be ejected from the at least one of the battery modules to the inside of the housing case, and the cooling air that has been taken in from the second intake duct and cooled the at least another one of the battery modules may be ejected from the at least another one of the battery modules to the inside of the housing case. The cooling air that has been taken in from the first intake duct and the cooling air that has been taken in from the second intake duct may be ejected from positions spaced from each other in a transversal direction.

The intake duct may include inflow parts that each introduce the cooling air into a corresponding one of the battery modules, and the inflow part that introduces the cooling air into the battery module located rearmost may include a rectification fin therein.

The battery cells may be lined up, and the battery modules may be disposed inside the housing case in a manner that the battery cells are arranged along a transversal direction.

DETAILED DESCRIPTION

Figure 1:
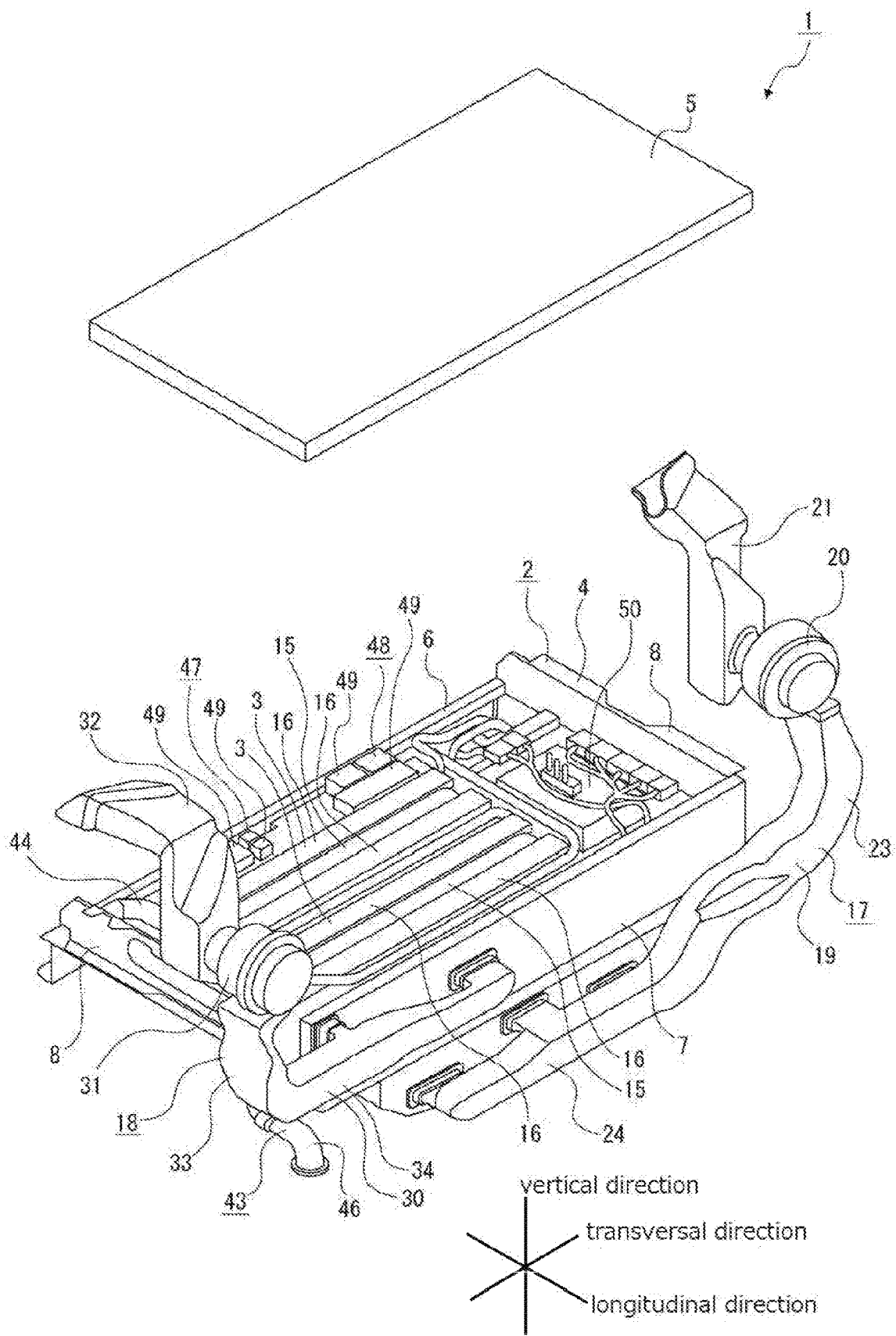
FIG. 1 illustrates an implementation of an onboard battery according to the present disclosure together with FIGS. 2 to 14, and is a perspective view of the onboard battery.

Hereinafter, a preferred implementation of the present disclosure will be described in detail with reference to the appended drawings. Note that, in this specification and the appended drawings, structural elements that have substantially the same function and structure are denoted with the same reference numerals, and repeated explanation of these structural elements is omitted.

An implementation of an onboard battery of the present disclosure will be described below with reference to the appended drawings.

Figure 2:
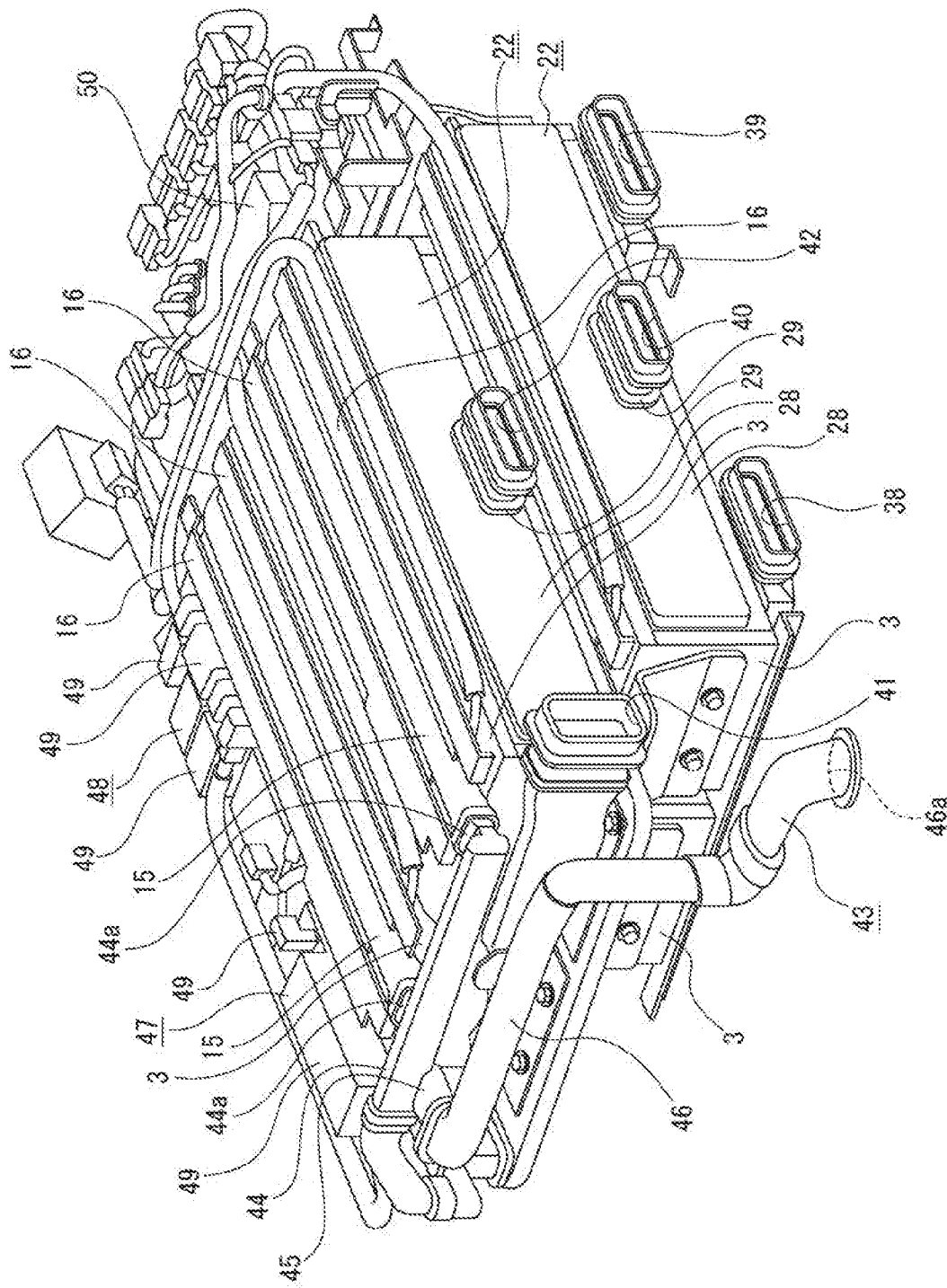
FIG. 2 is a perspective view of the onboard battery by omitting a part thereof.
Figure 3:
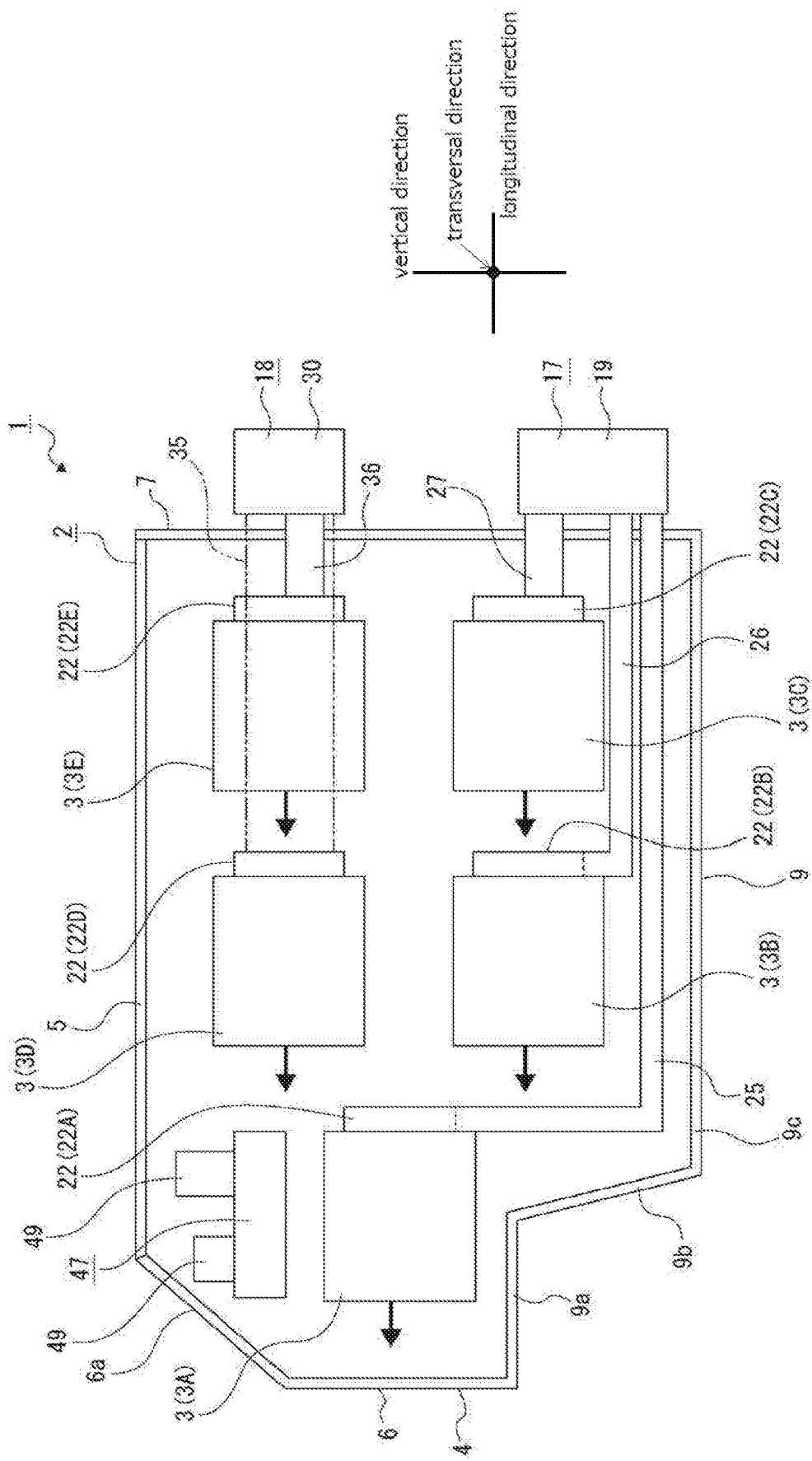
FIG. 3 is a schematic diagram illustrating a state or the like of disposition of battery modules in the onboard battery.

An onboard battery 1 includes a housing case 2 and battery modules 3 (see FIGS. 1 to 3). The onboard battery 1 is disposed in a trunk of a vehicle, for example.

The housing case 2 includes a housing part 4 and a lid part 5, the housing part 4 having an upward opening, the lid part 5 having a shape like a plate to seal the opening of the housing part 4 from the above.

The housing part 4 includes a front wall 6, a rear wall 7, two side walls 8, and a bottom wall 9. The front wall 6 faces the longitudinal direction, the rear wall 7 is located behind the front wall 6 and faces the longitudinal direction, the side walls 8 are located in spaced relation with each other in the transversal direction, and the bottom wall 9 faces the vertical direction. Each of the front wall 6, the rear wall 7, the side walls 8, and the bottom wall 9 is formed through extrusion of aluminum, for example, and has a hollow section.

Although not illustrated, for example, a plurality of hollows extending from side to side and arranged in the vertical direction are formed in each of the front wall 6 and the rear wall 7; a plurality of hollows extending in the longitudinal direction and arranged in the vertical direction are formed in each of the side walls 8; and a plurality of hollows extending from side to side and arranged in the longitudinal direction are formed in the bottom wall 9.

Almost an upper half part of the front wall 6 is an inclining part 6a that inclines so as to undergo displacement rearward as going upward.

The bottom wall 9 has a front end portion as an upper-stage part 9a that is higher than other parts of the bottom wall 9 by one level (see FIG. 3). The bottom wall 9 has a rear part as a lower-stage part 9c, and a bridging portion between the upper-stage part 9a and the lower-stage part 9c is a stepping part 9b facing substantially the longitudinal direction.

For example, five battery modules 3 are arranged in the longitudinal and vertical directions and are housed in the housing case 2. The battery modules 3 include a first battery module 3A located at the forefront, a second battery module 3B located behind the first battery module 3A, a third battery module 3C located behind the second battery module 3B, a fourth battery module 3D located behind the first battery module 3A and directly above the second battery module 3B, and a fifth battery module 3E located behind the fourth battery module 3D and directly above the third battery module 3C.

The first battery module 3A, the second battery module 3B, the third battery module 3C, the fourth battery module 3D, and the fifth battery module 3E are connected in series via electric wiring.

Figure 4:
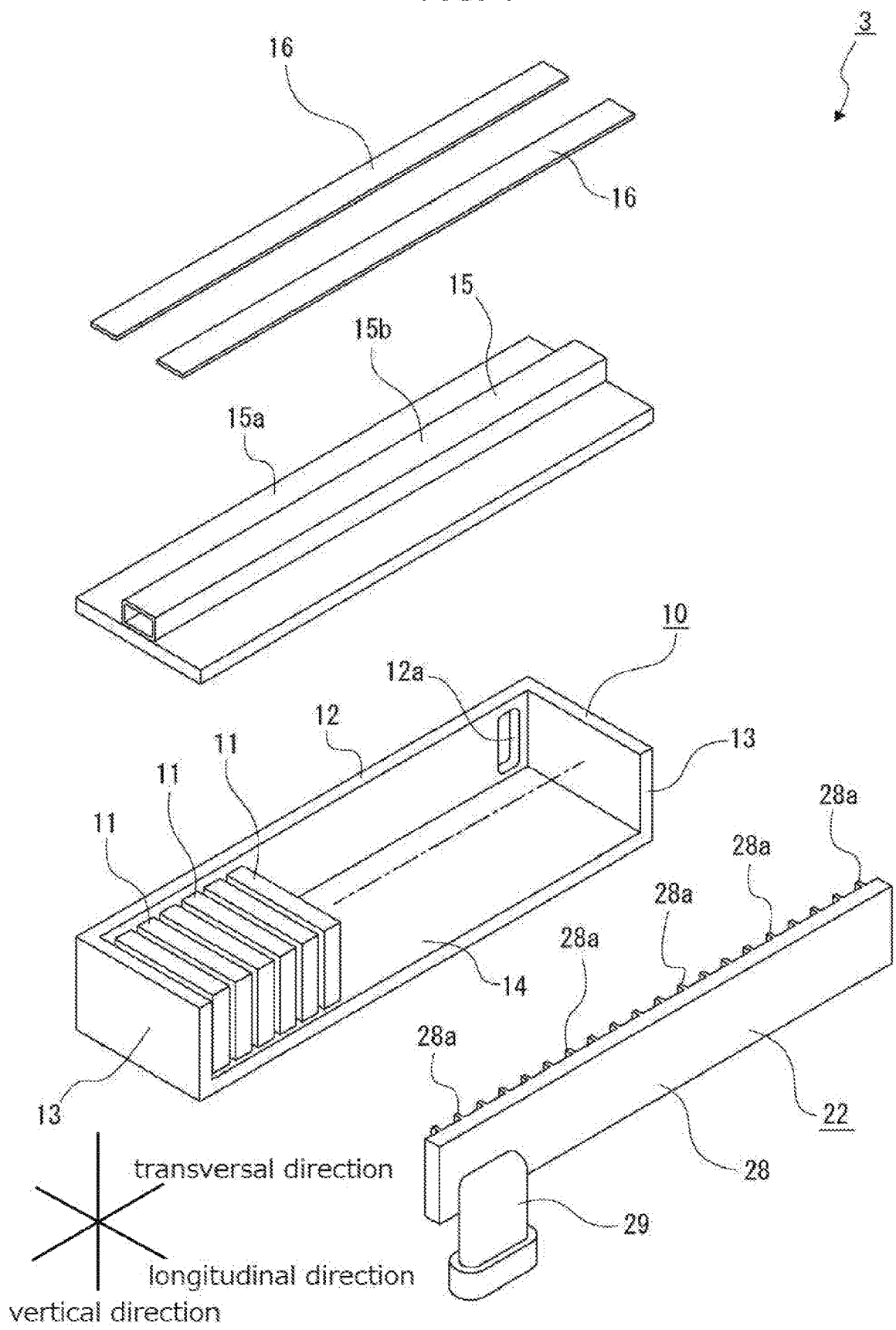
FIG. 4 is a schematic disassembled perspective view of a battery module and a joint duct.

Each of the battery modules 3 includes a case body 10 and a plurality of battery cells 11 housed inside the case body 10 (see FIG. 4).

The case body 10 has a shape of a rectangular box having upward and rearward openings. The case body 10 includes a wide front surface part 12, two side surface parts 13, and a wide bottom surface part 14. The front surface part 12 faces the longitudinal direction, the side surface parts 13 face the transversal direction and are located in spaced relation with each other in the transversal direction, and the bottom surface part 14 faces the vertical direction. The internal space of the case body 10 serves as a space for housing.

The front surface part 12 has an ejection hole 12a penetrating through the front surface part 12 in the longitudinal direction at any of a right end portion, a left end portion, and a center portion in the transversal direction. Specifically, the first battery module 3A has the ejection hole 12a at the right end portion of the front surface part 12, the second battery module 3B has the ejection hole 12a at the left end portion of the front surface part 12, the third battery module 3C has the ejection hole 12a at the center portion of the front surface part 12 in the transversal direction, the fourth battery module 3D has the ejection hole 12a at the right end portion of the front surface part 12, and the fifth battery module 3E has the ejection hole 12a at the center portion of the front surface part 12 in the transversal direction. FIG. 4 illustrates an example in which the ejection hole 12a is formed at the right end portion of the front surface part 12.

The battery cells 11 are, for example, arranged from side to side at regular intervals in a manner that the thickness direction of the battery cell corresponds to the transversal direction and housed in the space for housing to be held in the case body 10. For example, 19 battery cells 11 are held in the case body 10. In the state in which the battery cells 11 are held in the case body 10, constant spaces are formed between each adjacent battery cells 11. In addition, the battery cells 11 are connected in series.

As described above, in the onboard battery 1, the battery modules 3 are arranged inside the housing case 2 in a manner that the battery cells 11 are arranged along the transversal direction.

Accordingly, the battery modules 3 become wide, and the length of the onboard battery 1 in the longitudinal direction is shortened; furthermore, the housing case 2 can house a larger number of battery cells 11. Thus, the onboard battery 1 can be downsized and its performance can be increased at the same time.

The case body 10 is equipped with a gas-exhaust pipe 15 extending in the transversal direction. The gas-exhaust pipe 15 includes a base plate part 15a facing the vertical direction and a tubular part 15b located on the top surface of the base plate part 15a. The tubular part 15b is located at a center portion of the base plate part 15a in the longitudinal direction. The gas-exhaust pipe 15 is attached to the case body 10 in a manner that the base plate part 15a seals the upward opening of the case body 10.

Although not illustrated, gas-flowing holes are arranged from side to side at regular intervals on the lower surface of the gas-exhaust pipe 15. The gas-flowing holes of the gas-exhaust pipe 15 are located directly above the respective battery cells 11.

Two wide plates 16 are attached to both end portions of the base plate part 15a of the gas-exhaust pipe 15 in the longitudinal direction. Each of the plates 16 is connected with later-described electric wiring so that the battery cells 11 can be electrically controlled via the electric wiring and the plates 16, for example.

Although not illustrated, each of the battery cells 11 includes therein a valve that is capable of communication.

Each valve communicates with the corresponding one of the gas-flowing holes of the gas-exhaust pipe 15. In case malfunction occurs, gas might be generated inside a battery cell 11. However, the generation of gas increases the internal pressure of the battery cell 11 to open the valve, and the generated gas flows through the valve and the gas-flowing hole to the gas-exhaust pipe 15.

Although not illustrated, each of the battery modules 3 is mounted on the housing case 2 by a mounting plate and disposed at a predetermined position (see FIG. 3). The second battery module 3B and the third battery module 3C are disposed in the lower stage, the fourth battery module 3D and the fifth battery module 3E are disposed in the upper stage, and the first battery module 3A is disposed in the middle stage with respect to the second battery module 3B, the third battery module 3C, the fourth battery module 3D, and the fifth battery module 3E. Note that the first battery module 3A may be disposed in the lower stage as well as the second battery module 3B and the third battery module 3C, or may be disposed in the upper stage as well as the fourth battery module 3D and the fifth battery module 3E.

In driving the battery modules 3, cooling air is taken into the battery modules 3 from a first intake unit 17 and a second intake unit 18 (see FIGS. 1, 3, 5, and 6).

Figure 5:
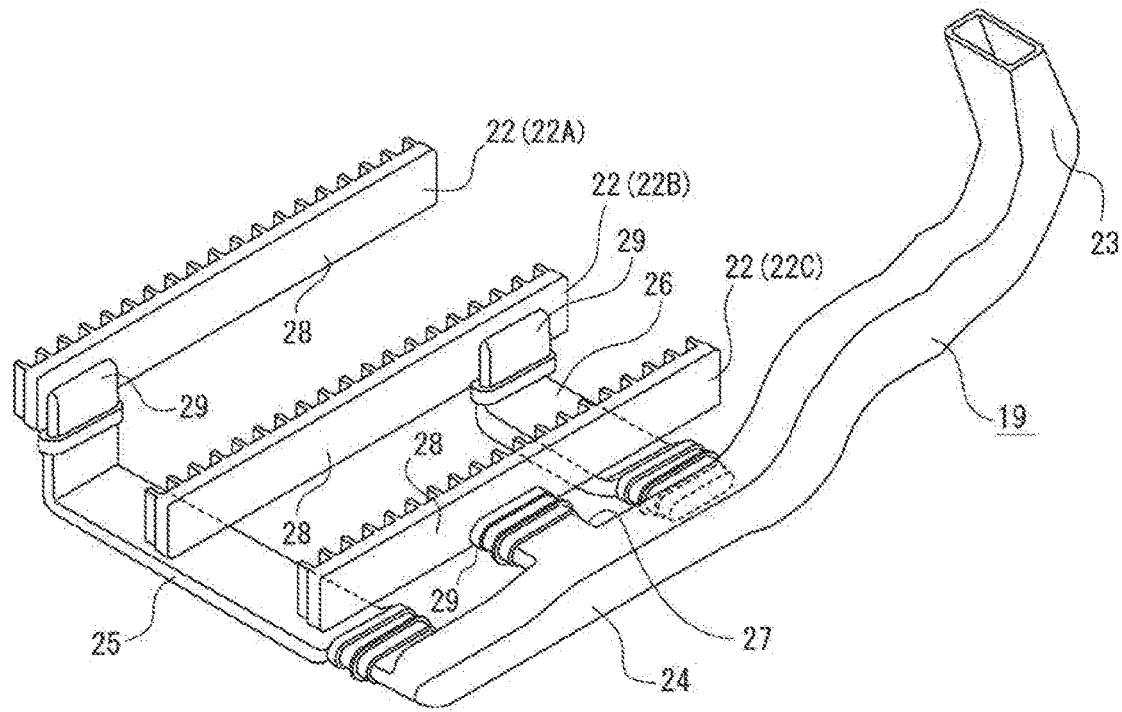
FIG. 5 is a perspective view of a first intake unit.

The first intake unit 17 includes a first intake duct 19, a first intake fan 20, a first intake pipe 21, and three joint ducts 22 (see FIGS. 1 and 5).

The first intake duct 19 takes the cooling air into the first battery module 3A, the second battery module 3B, and the third battery module 3C. The first intake duct 19 includes an intake part 23, an intermediate part 24, a first inflow part 25, a second inflow part 26, and a third inflow part 27.

The intake part 23 is located on the right side and substantially has a shape of V. Almost a half of the intake part 23 extends in a substantially vertical direction, and the other half thereof extends in a substantially transversal direction. The intermediate part 24 extends in the transversal direction, and a right end portion thereof continues to a left end portion of the intake part 23.

A front end portion of the first inflow part 25 is bent upward with respect to other portions of the first inflow part 25 that extend in the longitudinal direction. In addition, a rear end portion of the first inflow part 25 continues to a left end portion of the intermediate part 24. A front end portion of the second inflow part 26 is bent upward with respect to other portions of the second inflow part 26 that extend in the longitudinal direction. In addition, a rear end portion of the second inflow part 26 continues to the right end portion of the intermediate part 24. The third inflow part 27 extends in the longitudinal direction, and a rear end portion of the third inflow part 27 continues to a substantial center portion of the intermediate part 24 in the transversal direction. The lengths of the first inflow part 25, the second inflow part 26, and the third inflow part 27 in the longitudinal direction descend in this order.

The first intake fan 20 is linked to a top end portion of the intake part 23.

A lower end portion of the first intake pipe 21 is linked to the first intake fan 20. Therefore, when the first intake fan 20 rotates, the cooling air is taken in from the first intake pipe 21 and flows toward the first intake duct 19.

The joint ducts 22 consist of a first joint duct 22A, a second joint duct 22B, and a third joint duct 22C. The first joint duct 22A takes the cooling air into the first battery module 3A, the second joint duct 22B takes the cooling air into the second battery module 3B, and the third joint duct 22C takes the cooling air into the third battery module 3C.

The first joint duct 22A, the second joint duct 22B, and the third joint duct 22C are located in this order from the front.

Each of the joint ducts 22 includes a main body part 28 and a linking part 29. The main body part 28 has a wide substantially rectangular shape, and the linking part 29 projects from the main body part 28. The joint duct 22 has a space therein. The main body part 28 includes discharging projections 28*a* that project ahead and are spaced at regular intervals in the transversal direction. Each of the discharging projections 28*a* has an opening at a tip.

The linking part 29 of the first joint duct 22A projects downward from a left end portion of the main body part 28, the linking part 29 of the second joint duct 22B projects downward from a right end portion of the main body part 28, and the linking part 29 of the third joint duct 22C projects rearward from a center portion of the main body part 28 in the transversal direction.

Figure 6:
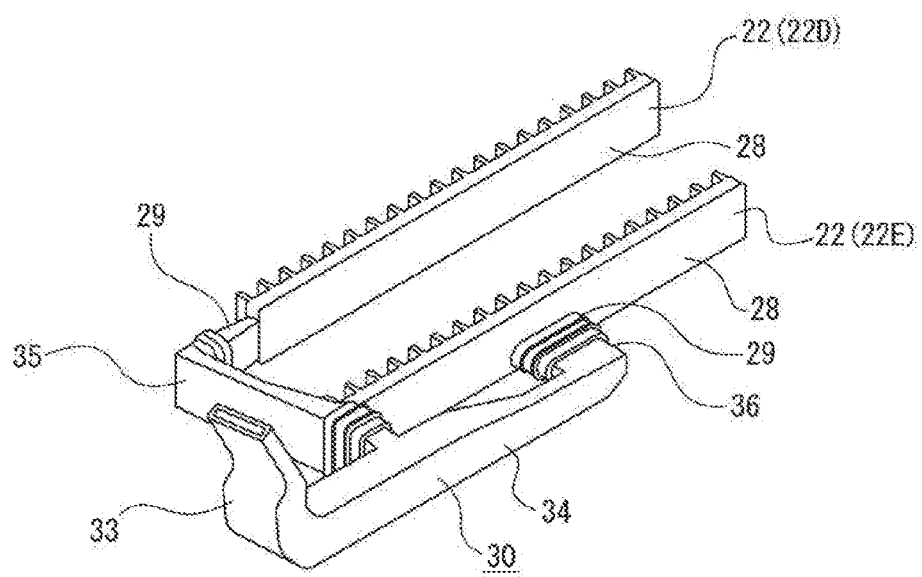
FIG. 6 is a perspective view of a second intake unit.

The second intake unit 18 includes a second intake duct 30, a second intake fan 31, a second intake pipe 32, and two joint ducts 22 (see FIGS. 1 and 6).

The second intake duct 30 takes the cooling air into the fourth battery module 3D and the fifth battery module 3E. The second intake duct 30 includes an intake part 33, an intermediate part 34, a fourth inflow part 35, and a fifth inflow part 36.

The intake part 33 is located on the left side and substantially has a shape of V. Almost a half of the intake part 33 extends in a substantially vertical direction, and the other half thereof extends in a substantially transversal direction. The intermediate part 34 extends in the transversal direction, and a left end portion thereof continues to a right end portion of the intake part 33.

A front end portion of the fourth inflow part 35 is bent rightward with respect to other portions of the fourth inflow part 35 that extend in the longitudinal direction. In addition, a rear end portion of the fourth inflow part 35 continues to the left end portion of the intermediate part 34. The fifth inflow part 36 extends in the longitudinal direction, and a rear end portion of the fifth inflow part 36 continues to a right end portion of the intermediate part 34. The length of the fourth inflow part 35 is longer than the length of the fifth inflow part 36 in the longitudinal direction.

The second intake fan 31 is linked to a top end portion of the intake part 33.

A lower end portion of the second intake pipe 32 is linked to the second intake fan 31. Therefore, when the second intake fan 31 rotates, the cooling air is taken in from the second intake pipe 32 and flows toward the second intake duct 30.

The joint ducts 22 consist of a fourth joint duct 22D and a fifth joint duct 22E. The fourth joint duct 22D takes the cooling air into the fourth battery module 3D, and the fifth joint duct 22E takes the cooling air into the fifth battery module 3E. The fourth joint duct 22D is located ahead of the fifth joint duct 22E.

A linking part 29 of the fourth joint duct 22D projects leftward from a left end portion of a main body part 28 of the fourth joint duct 22D, and a linking part 29 of the fifth joint duct 22E projects rearward from a center portion of a main body part 28 of the fifth joint duct 22E in the transversal direction.

Figure 7:
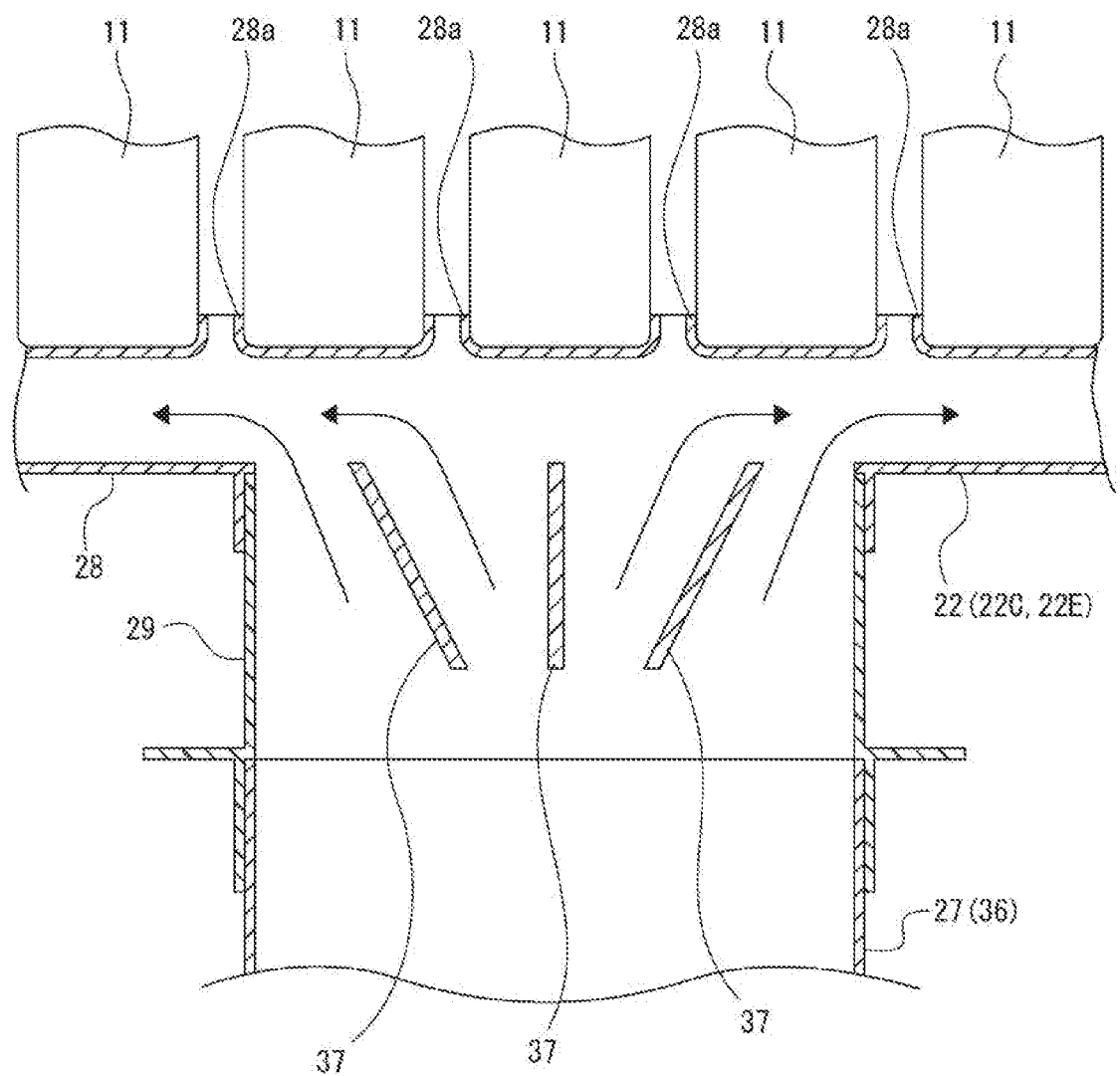
FIG. 7 is an enlarged cross-sectional view of a state in which rectification fins are disposed.

Three rectification fins 37 are disposed in each of the inside of the linking part 29 of the third joint duct 22C located rearmost of the first intake unit 17 and the inside of the linking part 29 of the fifth joint duct 22E located in the back of the second intake unit 18 (see FIG. 7). The rectification fins 37 are located in spaced relation with each other in the transversal direction. The rectification fin 37 located at the center faces the transversal direction, the left rectification fin 37 is located to have an inclination such that the front end thereof is more distanced from the center rectification fin 37, and the right rectification fin 37 is located to have an inclination such that the front end thereof is more distanced from the center rectification fin 37.

As illustrated in FIG. 1, the first intake unit 17 is disposed with respect to the housing case 2 such that the first intake fan 20 is located at the right of a rear end part of the housing case 2, and the intermediate part 24 of the first intake duct 19 is located to face the rear of the rear wall 7 of the housing case 2.

Figure 8:
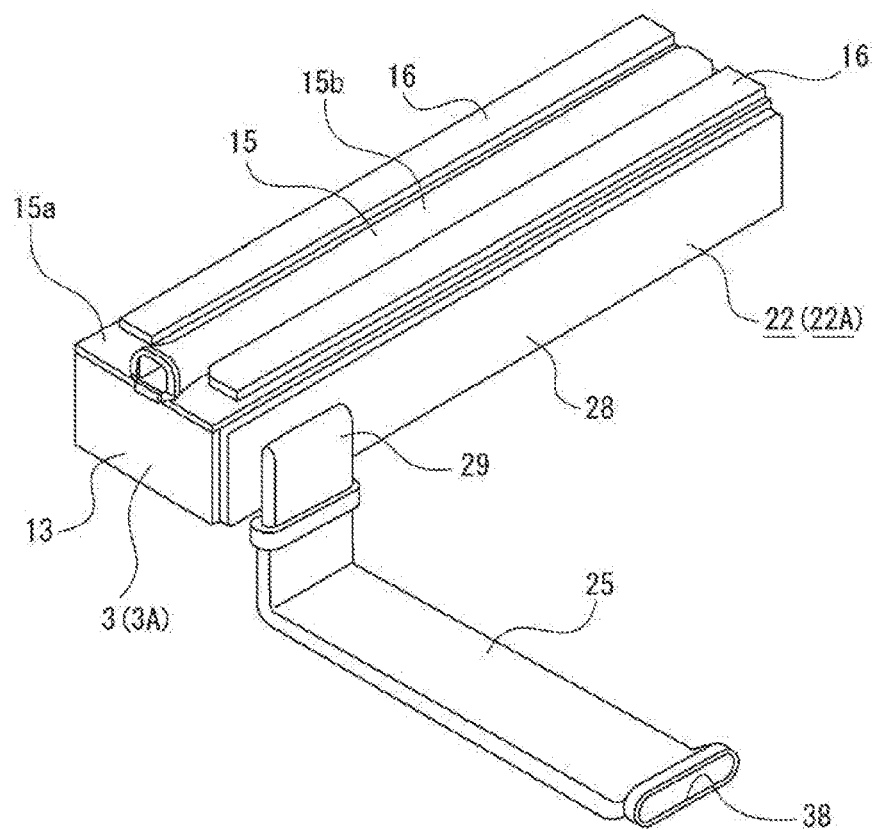
FIG. 8 illustrates battery modules and joint ducts together with FIGS. 9 to 12, and is a perspective view of a first battery module and a first joint duct.

In the state where the first intake unit 17 is disposed with respect to the housing case 2, the rear end portion of the first inflow part 25 penetrates through the rear wall 7, and the main body part 28 of the first joint duct 22A is located to face the rear surfaces of the battery cells 11 of the first battery module 3A (see FIG. 8). The first inflow part 25 is located below the second battery module 3B and the third battery module 3C inside the housing case 2.

The rear end portion of the first inflow part 25 is coupled to the rear wall 7 to project rearward from the rear wall 7 (see FIG. 2). The opening in the back of the first inflow part 25 serves as a first air intake hole 38 for taking the cooling air into the first battery module 3A.

Figure 9:
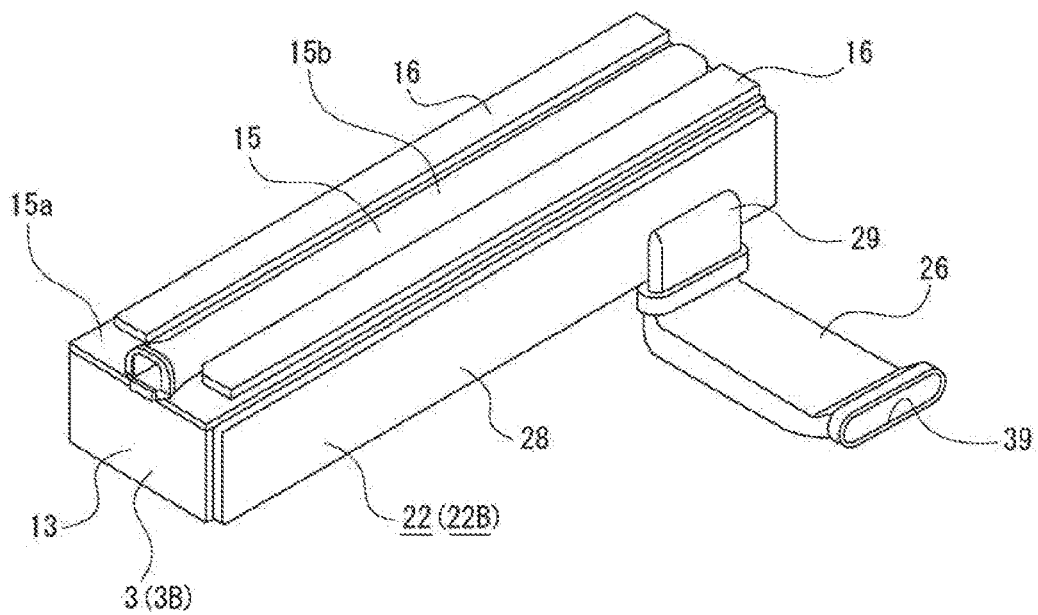
FIG. 9 is a perspective view of a second battery module and a second joint duct.

In the state where the first intake unit 17 is disposed with respect to the housing case 2, the rear end portion of the second inflow part 26 penetrates through the rear wall 7 (see FIG. 1), and the main body part 28 of the second joint duct 22B is located to face the rear surfaces of the battery cells 11 of the second battery module 3B (see FIG. 9). The second inflow part 26 is located below the third battery module 3C inside the housing case 2.

The rear end portion of the second inflow part 26 is coupled to the rear wall 7 to project rearward from the rear wall 7 (see FIG. 2). The opening in the back of the second inflow part 26 serves as a second air intake hole 39 for taking the cooling air into the second battery module 3B.

Figure 10:
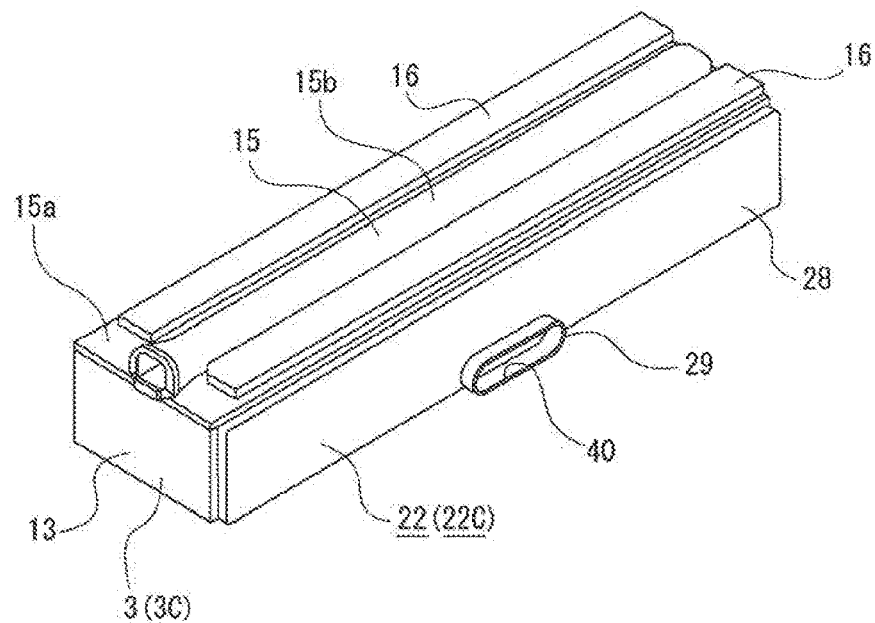
FIG. 10 is a perspective view of a third battery module and a third joint duct.

In the state where the first intake unit 17 is disposed with respect to the housing case 2, the third inflow part 27 penetrates through the rear wall 7 (see FIG. 1), and the main body part 28 of the third joint duct 22C is located to face the rear surfaces of the battery cells 11 of the third battery module 3C (see FIG. 10).

The third inflow part 27 is coupled to the rear wall 7 to project rearward from the rear wall 7 (see FIG. 2). The opening in the back of the third inflow part 27 serves as a third air intake hole 40 for taking the cooling air into the third battery module 3C.

As illustrated in FIG. 1, the second intake unit 18 is disposed with respect to the housing case 2 such that the second intake fan 31 is located on the left of the rear end part of the housing case 2, and the intermediate part 34 of the second intake duct 30 is located to face the rear of the rear wall 7 of the housing case 2. The intermediate part 34 is located above the intermediate part 24 of the first intake unit 17. Therefore, the intermediate part 24 and the intermediate part 34 do not overlap with each other in the longitudinal direction, resulting in downsizing of the onboard battery 1 in the longitudinal direction.

Figure 11:
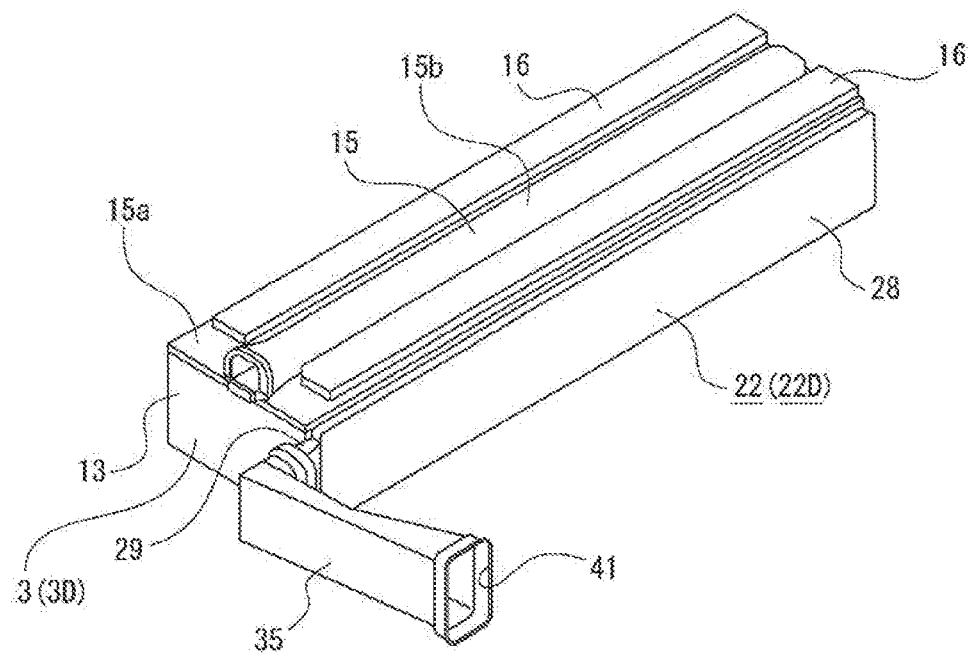
FIG. 11 is a perspective view of a fourth battery module and a fourth joint duct.

In the state where the second intake unit 18 is disposed with respect to the housing case 2, the rear end portion of the fourth inflow part 35 penetrates through the rear wall 7 (see FIG. 1), and the main body part 28 of the fourth joint duct 22D is located to face the rear surfaces of the battery cells 11 of the fourth battery module 3D (see FIG. 11). The fourth inflow part 35 is located on the left side of the fifth battery module 3E inside the housing case 2.

The rear end portion of the fourth inflow part 35 is coupled to the rear wall 7 to project rearward from the rear wall 7 (see FIG. 2). The opening in the back of the fourth inflow part 35 serves as a fourth air intake hole 41 for taking the cooling air into the fourth battery module 3D.

Figure 12:
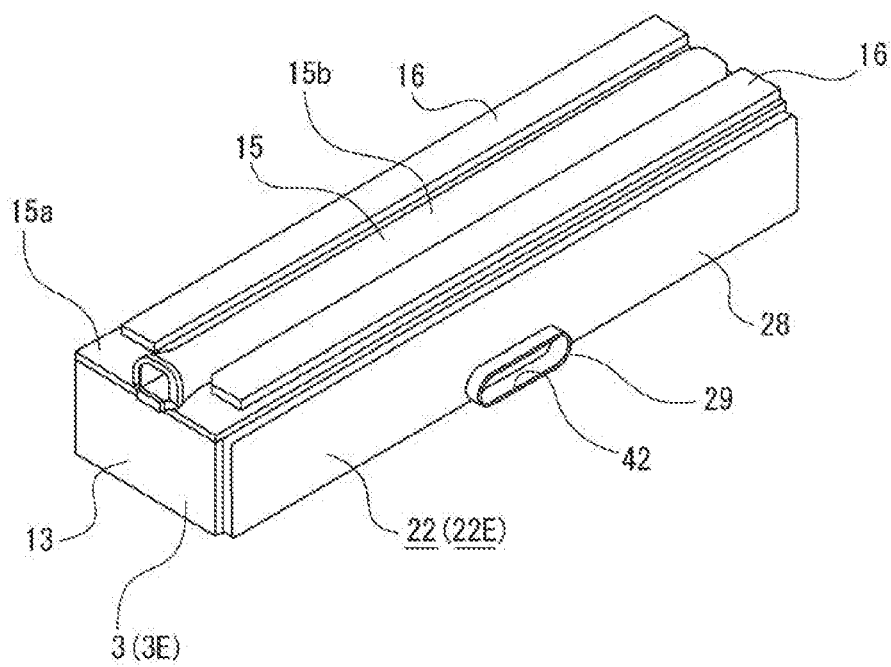
FIG. 12 is a perspective view of a fifth battery module and a fifth joint duct.

In the state where the second intake unit 18 is disposed with respect to the housing case 2, the fifth inflow part 36 penetrates through the rear wall 7 (see FIG. 1), and the main body part 28 of the fifth joint duct 22E is located to face the rear surfaces of the battery cells 11 of the fifth battery module 3E (see FIG. 12).

The fifth inflow part 36 is coupled to the rear wall 7 to project rearward from the rear wall 7 (see FIG. 2). The opening in the back of the fifth inflow part 36 serves as a fifth air intake hole 42 for taking the cooling air into the fifth battery module 3E.

As described above, the joint ducts 22 are located such that the respective main body parts 28 face the rear surfaces of the battery cells 11 (see FIGS. 8 to 12). Here, each of the discharging projections 28a of the main body part 28 is located between the battery cells 11 (see FIG. 7). Therefore, the cooling air discharged from each of the discharging projections 28a travels forward through spaces formed between the battery cells 11.

Now, a flow path of the cooling air will be described below.

When the first intake fan 20 and the second intake fan 31 rotate, air that is present outside the housing case 2 is taken from the first intake pipe 21 and the second intake pipe 32, respectively, into the first intake duct 19 and the second intake duct 30 as the cooling air.

The cooling air that has been taken into the first intake duct 19 flows from the intake part 23 to the intermediate part 24 to be split to the first inflow part 25, the second inflow part 26, and the third inflow part 27. The split cooling air flows toward the first joint duct 22A, the second joint duct 22B, and the third joint duct 22C to be discharged into the first battery module 3A, the second battery module 3B, and the third battery module 3C, respectively.

Because the linking part 29 of the third joint duct 22C located rearmost of the first intake unit 17 includes the rectification fins 37 therein, the rectification fins 37 cause pressure loss.

Accordingly, the cooling air that has flowed to the intermediate part 24 easily flows also into the first inflow part 25 and the second inflow part 26. Therefore, flow rates of the cooling air into the first battery module 3A, the second battery module 3B, and the third battery module 3C are averaged, resulting in an increase in cooling efficiency.

The rectification fins 37 are located as follows: the left rectification fin 37 has an inclination such that the front end thereof is more distanced from the center rectification fin 37, and the right rectification fin 37 has an inclination such that the front end thereof is more distanced from the center rectification fin 37.

Therefore, the cooling air that is introduced from a center portion of the third joint duct 22C in the transversal direction easily flows to the left and right, and uniform cooling air is easily discharged into the third battery module 3C in the transversal direction, thereby increasing the cooling efficiency of the battery cells 11 in the third battery module 3C.

The cooling air that is discharged into the first battery module 3A, the second battery module 3B, and the third battery module 3C travels forward through spaces between the battery cells 11, thereby cooling the battery cells 11. The cooling air that has traveled forward through the spaces between the battery cells 11 is ejected from the ejection hole 12a of the front surface part 12 to the internal space of the housing case 2.

On the other hand, the cooling air that has been taken into the second intake duct 30 flows from the intake part 33 to the intermediate part 34 to be split to the fourth inflow part 35 and the fifth inflow part 36. The split cooling air flows toward the fourth joint duct 22D and the fifth joint duct 22E to be discharged into the fourth battery module 3D and the fifth battery module 3E, respectively.

Because the linking part 29 of the fifth joint duct 22E located in the back of the second intake unit 18 includes three rectification fins 37 therein, the rectification fins 37 cause pressure loss.

Accordingly, the cooling air that has flowed to the intermediate part 34 easily flows also into the fourth inflow part 35 and the fifth inflow part 36. Therefore, flow rates of the cooling air into the fourth battery module 3D and the fifth battery module 3E are averaged, resulting in an increase in cooling efficiency.

The rectification fins 37 are located as follows: the left rectification fin 37 has an inclination such that the front end thereof is more distanced from the center rectification fin 37, and the right rectification fin 37 has an inclination such that the front end thereof is more distanced from the center rectification fin 37.

Therefore, the cooling air that is introduced from a center portion of the fifth joint duct 22E in the transversal direction easily flows to the left and right, and uniform cooling air is easily discharged into the fifth battery module 3E in the transversal direction, thereby increasing the cooling efficiency of the battery cells 11 in the fifth battery module 3E.

The cooling air that is discharged into the fourth battery module 3D and the fifth battery module 3E travels forward through spaces between the battery cells 11, thereby cooling the battery cells 11. The cooling air that has traveled forward through the spaces between the battery cells 11 is ejected from the ejection hole 12a of the front surface part 12 to the internal space of the housing case 2.

As described above, in the onboard battery 1, the first intake fan 20 and the second intake fan 31 are disposed at the right and left of the rear end part of the housing case 2, respectively. Accordingly, paths of the first intake duct 19 and the second intake duct 30 are short, thereby simplifying the structure of the onboard battery 1 and increasing the space efficiency.

In particular, because the first intake fan 20 and the second intake fan 31 are disposed at the right and left of the rear end part of the housing case 2, not behind the housing case 2, a large space can be secured behind the housing case 2. As will be described later, the onboard battery 1 is disposed, for example, above a floor panel of a trunk behind rear seats of the vehicle. Therefore, a spacious trunk can be secured and also a sufficient space for an impact absorber can be secured in case of crush at a rear end part of the vehicle, thereby increasing the crush performance.

In addition, because the first intake fan 20 and the second intake fan 31 are disposed at the right and left of the rear end part of the housing case 2, respectively, it is possible to form each of the intermediate part 24 of the first intake duct 19 and the intermediate part 34 of the second intake duct 30 as a substantially straight line extending from side to side.

Therefore, the onboard battery 1 can be downsized in the longitudinal direction, and also the cooling performance using cooling air can be increased because pressure loss is unlikely to occur in the intermediate part 24 and the intermediate part 34.

Furthermore, the first intake duct 19 and the second intake duct 30 are provided, so that the cooling air is introduced into the first battery module 3A, the second battery module 3B, and the third battery module 3C by the first intake duct 19, and also the cooling air is introduced into the fourth battery module 3D and the fifth battery module 3E by the second intake duct 30.

Because two intake ducts, the first intake duct 19 and the second intake duct 30, introduce the cooling air to the battery modules 3, the cooling performance of the onboard battery 1 can be increased.

As described above, in the onboard battery 1, the cooling air that has been taken in from the first intake duct 19 and cooled the battery cells 11 and the cooling air that has been taken in from the second intake duct 30 and cooled the battery cells 11 are ejected into the housing case 2. Accordingly, the temperature of each battery module 3 disposed in the housing case 2 tends to increase owing to the cooling air that has performed cooling; in particular, the temperature of the second battery module 3B disposed between the first battery module 3A and the third battery module 3C and below the fourth battery module 3D is easy to increase.

Figure 13:
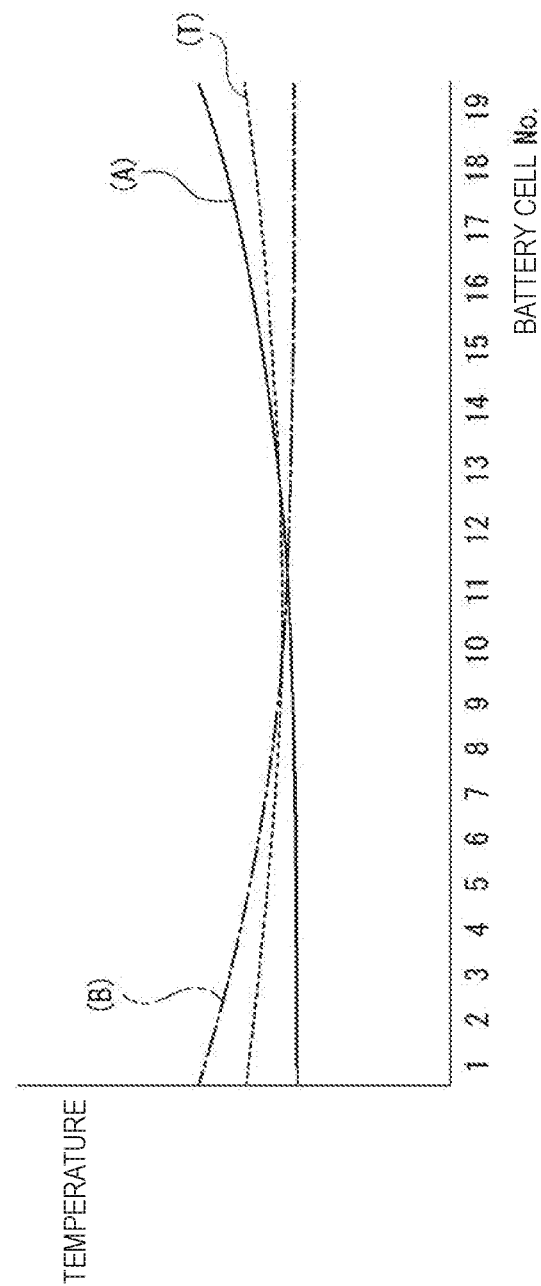
FIG. 13 is a graph illustrating a relation or the like between a battery cell and temperature.

FIG. 13 is a graph illustrating the temperature state during driving of the first battery module 3A and the second battery module 3B. In the graph, (A) indicates temperatures of the battery cells 11 in the first battery module 3A, and (B) indicates temperatures of the battery cells 11 in the second battery module 3B. Also, Cell No. 1 indicates the leftmost battery cell 11, and Cell No. 19 indicates the rightmost battery cell 11.

As for the first joint duct 22A disposed for the first battery module 3A, the linking part 29 thereof is located at the left end and the ejection hole 12a of the first battery module 3A is located at the right end. Thus, the cooling air that is discharged forward from the discharging projections 28a flows through the inside of the first battery module 3A from left to right. Therefore, the temperature of the cooling air becomes higher in the right, where the cooling air is delivered. That is, the battery cells 11 located closer to the right tend to have higher temperatures, as illustrated by (A) in FIG. 13.

In contrast, as for the second joint duct 22B disposed for the second battery module 3B, the linking part 29 thereof is located at the right end and the ejection hole 12a of the second battery module 3B is located at the left end. Thus, the cooling air that is discharged forward from the discharging projections 28a flows through the inside of the second battery module 3B from right to left. Therefore, the temperature of the cooling air becomes higher in the left, where the cooling air is delivered. That is, the battery cells 11 located closer to the left tend to have higher temperatures, as illustrated by (B) in FIG. 13.

In this manner, in the onboard battery 1, the temperature of the cooling air ejected from the first battery module 3A into the housing case 2 increases gradually from left to right, and the temperature of the cooling air ejected from the second battery module 3B into the housing case 2 increases gradually from right to left.

Therefore, the temperature gradient is inverted between the first battery module 3A and the second battery module 3B. Thus, the internal temperature of the housing case 2 is averaged in the transversal direction (see (T) in FIG. 13).

As described above, in the onboard battery 1, the flowing direction of the cooling air in the first battery module 3A is opposite to the flowing direction of the cooling air in the second battery module 3B, and the cooling air from the first battery module 3A and the second battery module 3B is ejected from positions spaced from each other in the transversal direction.

Therefore, the temperature gradient is inverted between the first battery module 3A and the second battery module 3B. Thus, the internal temperature of the housing case 2 is averaged in the transversal direction. Also, each component disposed inside the housing case 2 is unlikely to be affected locally by heat, thereby securing appropriate operations of each component disposed inside the housing case 2.

As described above, because the second battery module 3B is disposed between the first battery module 3A and the third battery module 3C and below the fourth battery module 3D, the temperature thereof is easy to increase. However, in the first intake unit 17, the length of the second inflow part 26 toward the second battery module 3B is shorter than the length of the first inflow part 25 toward the first battery module 3A.

Because a flowing distance of the cooling air flowing through the second inflow part 26 is short, the cooling air is less affected by the internal temperature of the housing case 2 or the like during flowing, thereby securing a high cooling performance of the battery cells 11 of the second battery module 3B.

In the onboard battery 1, the first inflow part 25 and the second inflow part 26 are located at both left and right end portions and the third inflow part 27 is located in a center portion in the transversal direction in the first intake unit 17, and the fourth inflow part 35 and the fifth inflow part 36 are located at both left and right end portions in the second intake unit 18. Thus, the first intake unit 17 and the second intake unit 18 have substantially symmetric structures.

Accordingly, in a case of disposing heaters on the lower surface side of the battery modules 3, the heaters heating the battery modules 3 in cold areas, it becomes easy to dispose the heaters symmetrically, thereby homogenizing the heating performance for the battery modules 3.

Furthermore, the first inflow part 25, the second inflow part 26, and the third inflow part 27 are located in spaced relation with one another in the transversal direction, and the fourth inflow part 35 and the fifth inflow part 36 are located in spaced relation with each other in the transversal direction. Thus, the first inflow part 25, the second inflow part 26, and the third inflow part 27 do not overlap with one another in the vertical direction, and also the fourth inflow part 35 and the fifth inflow part 36 do not overlap with each other in the vertical direction, thereby downsizing the onboard battery 1 in the vertical direction.

Figure 14:
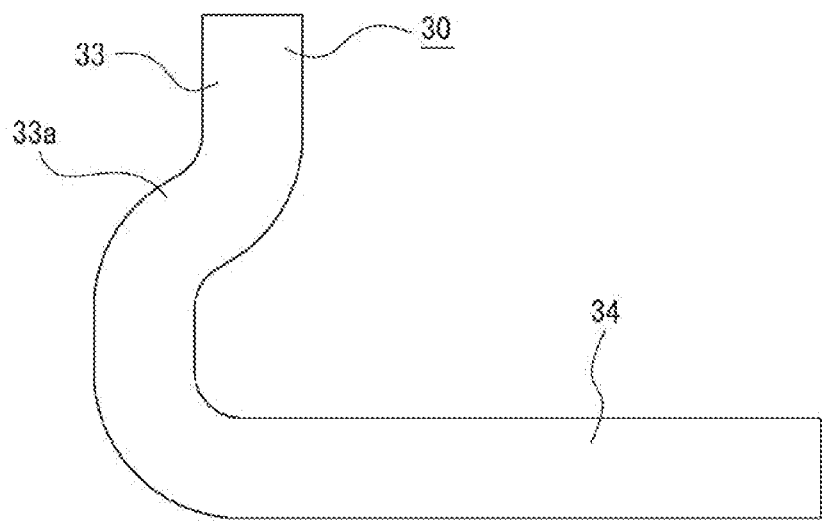
FIG. 14 is a schematic rear view of a part of a second intake duct.

In order to dispose the second intake fan 31 at a predetermined position, the intake part 33 of the second intake unit 18 has, as a part thereof, a curved portion 33a having a curve in the transversal direction (see FIG. 14). Accordingly, in the second intake unit 18, pressure loss occurs owing to the curved portion 33a and the flowability of the cooling air might become somewhat lower than that in the first intake unit 17.

Therefore, the onboard battery 1 is configured to secure a sufficient cooling performance for the fourth battery module 3D and the fifth battery module 3E by reducing the number of the battery modules 3 to be cooled by the second intake unit 18 to two and thereby shortening the flowing path of the cooling air.

A gas-exhaust duct 43 is disposed on the left of the battery modules 3 (see FIG. 2). The gas-exhaust duct 43 includes two linking parts 44 (only one of the linking parts 44 is illustrated) linked to the gas-exhaust pipes 15 disposed above the battery modules 3, a projecting part 45, and an exhaust part 46. The linking parts 44 are linked to each other in spaced relation with each other in the vertical direction, the projecting part 45 projects leftward from the one of the linking parts 44, and the exhaust part 46 is linked to the projecting part 45.

The linking parts 44 are disposed in the internal space of the housing case 2. The linking part 44 includes three coupling projections 44a that project rightward, and each of the coupling projections 44a is coupled to a left end portion of the corresponding one of the gas-exhaust pipes 15.

The projecting part 45 penetrates through the side wall 8 of the housing case 2.

The exhaust part 46 is disposed along the side wall 8 outside the side wall 8, and a tip thereof has an exhaust hole 46a.

In case of malfunction in the battery cells 11, gas flows from the gas-exhaust pipes 15 to the linking parts 44, the projecting part 45, and the exhaust part 46 in this order, and is discharged through the exhaust hole 46a to the outside of the housing case 2.

In the internal space of the housing case 2 are disposed a first junction box 47 and a second junction box 48 that each serve as a control device that controls the battery modules 3 (see FIG. 1). The first junction box 47 and the second junction box 48 are arranged side by side in the transversal direction, and located above the first battery module 3A in front of the fourth battery module 3D.

Each of the first junction box 47 and the second junction box 48 includes control components 49 that control current or the like. Examples of the control components 49 include relay, fuse, and connector terminals. The first junction box 47 and the second junction box 48 are connected with a power supply circuit (inverter) (not illustrated) installed in the underfloor of the vehicle via later-described conductive lines.

The cooling air that has been discharged from the joint ducts 22 and cooled the battery cells 11 of the battery modules 3 is introduced to the area in which the first junction box 47 and the second junction box 48 are disposed in the internal space of the housing case 2, and the cooling air cools the first junction box 47 and the second junction box 48.

In general, in terms of temperature management, it is desirable to set the temperatures of the battery modules 3 to 60° C. or less and to set the temperatures of the first junction box 47 and the second junction box 48 to 100° C. or less. Accordingly, even if the first junction box 47 and the second junction box 48 are cooled by the cooling air that has an increased temperature by cooling the battery cells 11, a sufficient cooling performance using the cooling air for the first junction box 47 and the second junction box 48 is secured.

In a right end portion of the internal space of the housing case 2 are disposed an auxiliary device 50 and a control unit (not illustrated) arranged along the vertical direction. The auxiliary device 50 charges the vehicle in a non-running state of the vehicle, such as nighttime, and the control unit controls the entire onboard battery 1.

The cooling air that has cooled the battery cells 11 is also introduced to the area in which the auxiliary device 50 is disposed in the internal space of the housing case 2, thereby cooling the auxiliary device 50 and the control unit.

As described above, in the onboard battery 1, the cooling air is taken from rearward into the battery modules 3 via the first intake duct 19 and the second intake duct 30, and five battery modules 3 are provided, including the second battery module 3B and the fourth battery module 3D being disposed in the upper and lower stages, the third battery module 3C and the fifth battery module 3E being disposed in the upper and lower stages, and the first battery module 3A being disposed at the forefront.

Accordingly, the first battery module 3A that is disposed at the forefront and is easily heated is less affected by heat generated in the other battery modules 3. Thus, the cooling efficiency of the battery modules 3 can be increased, and an increase in temperature due to heat generation of the battery cells 11 can be suppressed.

In addition, the first battery module 3A that is disposed at the forefront is disposed in the middle stage with respect to the battery modules 3 that are disposed in the upper and lower stages. Thus, an influence of heat generated in the battery modules 3 located rearward is further reduced, and an increase in temperature due to heat generation of the battery cells 11 can be further suppressed.

Although the example of disposing five battery modules 3 has been described above, the number of the battery modules 3 disposed inside the housing case 2 is at least three. At least two battery modules 3 are disposed in the upper and lower stages, and one battery module 3 is disposed at the forefront.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. An onboard battery for a vehicle, the onboard battery comprising:
   a plurality of battery modules that includes a first battery module, a second battery module, and a third battery module,
   wherein each of the plurality of battery modules includes a case body and battery cells housed in the case body, and
   wherein the case body of each of the plurality of battery modules includes:
      a front surface part facing a front side of a longitudinal direction; and
      an ejection hole provided on the front surface part;
   a housing case that houses the plurality of battery modules,
      wherein the first battery module is arranged in an upper stage of the housing case,
      wherein the second battery module is arranged below the first battery module in a lower stage of the housing case, the lower stage being vertically below the upper stage with respect to a bottom wall of the housing case, and
      wherein the third battery module is arranged, in a front-rear direction, in front more than the first battery module and the second battery module, the third battery module being arranged in a middle stage with respect to the first battery module and the second battery module;
   a plurality of joint ducts that includes a first joint duct, a second joint duct, and a third joint duct,
      wherein each of the plurality of joint ducts includes a main body part,
      wherein the main body part includes discharging projections,
      wherein the first joint duct is connected to the first battery module so that the main body part and the discharging projections of the first joint duct faces the front surface part of the case body of the first battery module,
      wherein the second joint duct is connected to the second battery module so that the main body part and the discharging projections of the second joint duct faces the front surface part of the case body of the second battery module, and
      wherein the third joint duct is connected to the third battery module so that the main body part and the discharging projections of the third joint duct faces the front surface part of the case body of the third battery module; and
   a first intake duct and a second intake duct located outside the housing case,
      wherein the first intake duct is connected to the second battery module via the second joint duct and the first intake duct is connected to the third battery module via the third joint duct,
      wherein the first intake duct is configured to:
         introduce cooling air into the second battery module, the cooling air introduced in the second battery module being discharged from the discharging projections of the main body part of the second joint duct; and
         introduce the cooling air into the third battery module, the cooling air introduced in the third battery module being discharged from the discharging projections of the main body part of the third joint duct,
      wherein the second intake duct is connected to the first battery module via the first joint duct,
      wherein the second intake duct is configured to introduce the cooling air into the first battery module, the cooling air introduced in the first battery module being discharged from the discharging projections of the main body part of the first joint duct,
      wherein the cooling air introduced from the first intake duct into the second battery module is ejected from the ejection hole of the second battery module to an internal space of the housing case,
      wherein the cooling air introduced from the first intake duct into the third battery module is ejected from the ejection hole of the third battery module to the internal space of the housing case, and
      wherein the cooling air introduced from the second intake duct into the first battery module is ejected from the ejection hole of the first battery module to the internal space of the housing case.

2. The onboard battery for the vehicle according to claim 1, further comprising a fan linked to at least one of the first intake duct or the second intake duct,
   wherein the fan is on at least one of a left side or a right side, in a rear end part, of the housing case.

3. The onboard battery for the vehicle according to claim 1,
   wherein the first intake duct includes a first inflow part and a second inflow part disposed at intervals,
   wherein the second intake duct includes a third inflow part,
   wherein the first inflow part of the first intake duct introduces the cooling air into the third battery module via the third joint duct, wherein the second inflow part of the first intake duct introduces the cooling air into the second battery module via the second joint duct, and wherein the third inflow part of the second intake duct introduces the cooling air into the first battery module via the first joint duct.

4. The onboard battery for the vehicle according to claim 2, wherein the first intake duct includes a first inflow part and a second inflow part disposed at intervals, wherein the second intake duct includes a third inflow part, wherein the first inflow part of the first intake duct introduces the cooling air into the third battery module via the third joint duct, wherein the second inflow part of the first intake duct introduces the cooling air into the second battery module via the second joint duct, and wherein the third inflow part of the second intake duct introduces the cooling air into the first battery module via the first joint duct.

5. The onboard battery for the vehicle according to claim 1, wherein the battery cells in each of the plurality of battery modules are aligned, and wherein the plurality of battery modules are inside the housing case such that the battery cells in each of the plurality of battery modules are arranged along a transversal direction.

6. The onboard battery for the vehicle according to claim 2, wherein the battery cells in each of the plurality of battery modules are aligned, and wherein the plurality of battery modules are inside the housing case such that the battery cells in each of the plurality of battery modules are arranged along a transversal direction.

7. The onboard battery for the vehicle according to claim 3, wherein the battery cells in each of the plurality of battery modules are aligned, and wherein the plurality of battery modules are inside the housing case such that the battery cells in each of the plurality of battery modules are arranged along a transversal direction.

8. The onboard battery for the vehicle according to claim 4, wherein the battery cells in each of the plurality of battery modules are aligned, and wherein the plurality of battery modules are inside the housing case such that the battery cells in each of the plurality of battery modules are arranged along a transversal direction.

9. The onboard battery for the vehicle according to claim 1, wherein the second battery module is arranged below the first battery module, and wherein the third battery module is a sole battery module that is arranged foremost of the plurality of battery modules.

10. The onboard battery for the vehicle according to claim 1, wherein the battery cells in each of the plurality of battery modules are arranged at intervals in a manner that a thickness direction of each of the battery cells corresponds to a transversal direction and the cooling air passes through spaces between the battery cells in each of the plurality of battery modules.

* * * * *